US006926166B1

(12) United States Patent
Bitton et al.

(10) Patent No.: US 6,926,166 B1
(45) Date of Patent: Aug. 9, 2005

(54) DEVICE FOR COMBINING CANDY DISPENSERS AND HEALTH AND BEAUTY AID DISPENSERS

(76) Inventors: Mary Kay Bitton, 467 Burano Ct., Oak Park, CA (US) 91377; Brianna R. Bitton, 467 Burano Ct., Oak Park, CA (US) 91377; Robert P. M. Bitton, 467 Burano Ct., Oak Park, CA (US) 91377

( * ) Notice: Subject to any disclaimer, the term of this patent is extended or adjusted under 35 U.S.C. 154(b) by 0 days.

(21) Appl. No.: 10/112,297

(22) Filed: Mar. 27, 2002

(51) Int. Cl.[7] .......................... B65G 59/00; B65H 1/00; G07F 11/00

(52) U.S. Cl. ............................ 221/122; 221/4; 221/22; 206/823; 222/192; 401/57

(58) Field of Search ............................ 221/22, 4, 122, 221/2, 7; 266/823; 222/192; 401/57; 700/236, 240, 242, 244, 247; 70/277, 278.1, 278.7, 283, 279.1; 206/823

(56) References Cited

U.S. PATENT DOCUMENTS

| | | | | | |
|---|---|---|---|---|---|
| 1,933,596 | A | * | 11/1933 | MacLean | 206/56 |
| 3,171,416 | A | * | 3/1965 | Pimentel | 132/79 |
| 3,471,056 | A | * | 10/1969 | Kovac | 221/151 |
| 3,515,111 | A | * | 6/1970 | Auge | 124/16 |
| 3,612,348 | A | * | 10/1971 | Thomas | 221/2 |
| 3,762,539 | A | * | 10/1973 | Kerr | 206/42 |
| 3,771,881 | A | * | 11/1973 | Swenson | 401/75 |
| 3,809,102 | A | * | 5/1974 | Ross | 132/297 |
| 4,154,365 | A | * | 5/1979 | Lorca | 221/4 |
| 4,171,753 | A | * | 10/1979 | Vreede | 221/197 |
| RE31,408 | E | * | 10/1983 | Czech et al. | 222/341 |
| 4,524,871 | A | * | 6/1985 | Klinger | 206/233 |
| 4,589,575 | A | * | 5/1986 | Rigberg et al. | 221/198 |
| 4,844,250 | A | * | 7/1989 | Holoubek et al. | 222/107 |
| 4,887,924 | A | * | 12/1989 | Green | 401/261 |
| 4,888,667 | A | * | 12/1989 | Hwang | 362/109 |
| 4,901,848 | A | * | 2/1990 | Parren | 206/86 |
| 4,972,858 | A | * | 11/1990 | Beck et al. | 132/218 |
| 5,316,398 | A | * | 5/1994 | Chandaria et al. | 401/18 |
| 5,373,940 | A | * | 12/1994 | Hillelson | 206/385 |
| 5,531,318 | A | * | 7/1996 | Coleman et al. | 206/738 |
| 5,573,109 | A | * | 11/1996 | Isacson | 206/38.1 |
| 5,655,554 | A | * | 8/1997 | Goldberg | 132/314 |
| 5,687,896 | A | * | 11/1997 | Clift | 224/587 |
| 5,819,993 | A | * | 10/1998 | Wile | 222/390 |
| 5,848,731 | A | * | 12/1998 | Deering | 222/129 |
| 5,881,742 | A | * | 3/1999 | Hunsberger | 132/297 |
| 6,241,408 | B1 | * | 6/2001 | Lang | 401/17 |
| 6,328,163 | B1 | * | 12/2001 | Coleman et al. | 206/457 |
| 6,405,737 | B1 | * | 6/2002 | Sheffler et al. | 132/318 |
| 6,425,495 | B1 | * | 7/2002 | Senda et al. | 221/24 |
| 6,450,179 | B2 | * | 9/2002 | Bengis | 132/297 |
| 6,488,427 | B1 | * | 12/2002 | Bredienbach et al. | 401/75 |
| 6,554,516 | B1 | * | 4/2003 | Christopher | 401/31 |
| 6,607,323 | B2 | * | 8/2003 | Breidenbach et al. | 401/6 |
| 6,675,815 | B1 | * | 1/2004 | Hofstad | 132/309 |
| 2003/0118699 | A1 | * | 6/2003 | Nicosia | 426/104 |

* cited by examiner

*Primary Examiner*—Donald P. Walsh
*Assistant Examiner*—Michael E. Butler
(74) *Attorney, Agent, or Firm*—Susan L. Crockett, Esq.; Crockett & Crockett

(57) ABSTRACT

A product combining individual novelty candy dispensers and health and beauty dispensers into a single device. In one embodiment a lip balm dispenser is combined with a breath spray dispenser into a single product. In another embodiment, a lip embodiment a lip balm dispensers is combined with a candy dispenser into a single product. In a third embodiment, a candy dispenser, breath spray dispenser and lip balm dispenser are all combined into one product.

3 Claims, 2 Drawing Sheets

DEVICE FOR COMBINING CANDY DISPENSERS AND HEALTH AND BEAUTY AID DISPENSERS

FIELD OF THE INVENTIONS

This invention relates to products combining novelty candy dispensers and novelty health and beauty dispensers.

BACKGROUND OF THE INVENTIONS

Candy and health and beauty aids, such as lip balms and breath sprays, have been individually popular for many years. However, the commercial success of these products is, in part, due to inventive product dispensers as well as creative packaging and marketing. For example, a variety of lip balms have been marketed to young girls in the form of brightly colored dispensers decorated with glitter. Specific examples include products such as Lip Smackers™ and Lip Rageous™. Likewise, candy and breath sprays dispensers have been designed to market these products to children. Despite the individual success of these products, most of these products are not combined with each other into a single product.

Nevertheless, in unrelated arts a candy attachment has been placed on a writing instrument. In addition, lipstick and lip gloss have been placed in a combined product. Also, lash primer and mascara have been combined in a single product.

A constant problem faced by the candy and health and beauty industries is to continuously design new product dispensers and delivery mechanisms. Most products lose their novelty value relatively quickly, so increased sales depend on a constant flow of new, creative dispensers and delivery mechanism designs. Another problem faced by the industry is to make some products, such as lip balm, more desirable to boys. The devices and methods described in this application address these problems.

SUMMARY

The methods and systems described below detail combinations of candy dispensers, lip balm dispensers, and breath spray dispensers. In one embodiment a lip balm dispenser is combined with a breath spray dispenser into a single product. In another embodiment, a lip balm dispenser is combined with a candy dispenser into a single product. In a third embodiment, a candy dispenser, breath spray dispenser, and lip balm dispenser are all combined into one product.

The combination products have many uses. Several of the combinations will be easier to market to boys. For example, a combined candy dispenser and lip balm dispenser will make selling lip balm to boys easier and increase the probability that a boy will use lip balm. The combined products also increase the likelihood that a parent will be able to get a child to remember to carry lip balm or breath spray. Other uses for the combined products include a means to carry both products more conveniently, to save space, as a reminder to have people soften their lips and freshen their breath, to sell more lip balm, candy, and breath spray, and as collectable or novelty items.

DETAILED DESCRIPTION OF THE INVENTIONS

Figure 1:
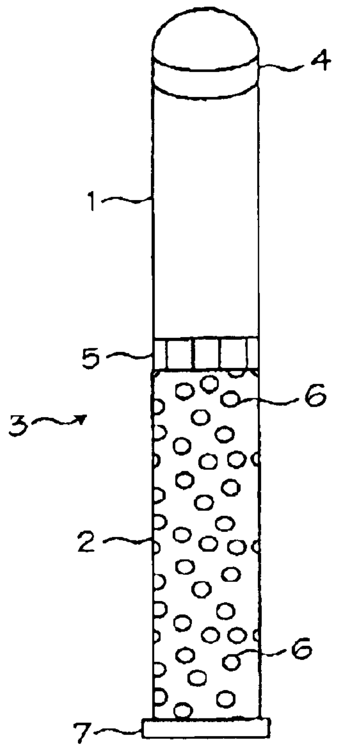
FIG. 1 shows a combined lip balm dispenser and candy dispenser.

FIG. 1 shows a combined lip balm dispenser 1 and candy dispenser 2. The combination product 3 is cylindrically shaped, to reflect the shape of common lip balm dispensers. Other combination products may have cross sections or overall designs in the shape of stars, boxes, animals, plants, characters, or other uniform or irregular geometrical patterns. The combination product 3 is decoratively colored and marked so as to maximize its appeal to targeted customers. Thus, the combination product can be of many different colors, glittered, can be transparent or opaque, can be molded into different shapes, and can have a variety of pictures and designs imprinted upon it. In addition, each section of the combination product can have a different design in order to more easily differentiate the dispensers. Moreover, different patterns of colors, transparency, molds and pictures can be placed on each section.

The first section 1 of the combination product comprises a lip balm dispenser made of a relatively hard material such as a hard plastic. The first section 1 is sealed by a cap 4, that is releasably attached by means of a screw cap. The cap can also be releasably attached with a slidable cap, a hinged cap, or a spring cap. The lip balm dispenser 1 may contain many different kinds of lip balm, such as lip gloss, lipstick, lip softener, flavored lip balm, Chapstick®, Carmex™, and other lip products such as those produced or marketed by Blistex, OraLabs, Carma Laboratories, Whitehall-Robbins Healthcare, Lip Smackers, Lip Rageous, and others. Flavored lip balm can include a variety of flavors including berries, mixed berries, fruits, mints, vanilla, chocolate, or bubblegum. Specific example flavors include strawberry, apple, cherry, peppermint, spearmint, lemon, fruit punch, watermelon, and peach. The lip balm can be colored with a variety of different colors, such as red, green, blue, yellow, or other color or combination of colors.

As the consumer uses lip balm, more lip balm is pushed up by means of an actuator 5 located at the juncture between the first and second sections. The actuator 5 is a typical twist actuator that forces the lip balm out of the dispenser 2. However, the actuator 5 can be any kind of actuator and can be placed anywhere on the combination product. Typical actuators include a twist actuator, a push actuator that simply pushes the lip balm stick directly through the dispenser, or a spring actuator that automatically adjusts the height of the lip balm stick. Alternatively, the first section can be made from a pliant material, such as a soft plastic, so that the user can squeeze out lip balm by squeezing on the first section 1. In a second alternative, the cap on the first section can have an applicator attached to it. The applicator has a sponge that is dipped into the lip balm and then applied to the lips. In a third alternative the lip balm can be applied with a roll-on applicator.

The second section 2 of the combination product comprises a candy dispenser made of a relatively hard material, such as a hard plastic. The second section 2 is rotatably attached to the first section 1 at their respective bottoms such that the second section is part of the actuator 5 mechanism. Thus, twisting on the second section will force lip balm out of the first section. Alternatively, if the second section 2 has a radius slightly smaller than the radius of the first section 1, then the second section can be slidably attached to the first section. In this case the consumer merely pushes on the second section to force lip balm out of the first section. In other alternatives, the second section may be releasably or permanently attached to the first section and may or may not be a part of the actuator mechanism. In addition, the second section can be fashioned and decorated as described for the first section. For example, the second section can be molded into a transparent action figure.

The second section 2 contains candy 6 sized and proportioned to fit inside the second section 2. Example candies include gum, breath mints, popsicles, lollipops, rock candy, hard candy, jelly beans, Life Saver Hole™, M&Ms™, Jaw Breakers™, or any other suitable commercially available candy. Alternatively, the candy can be a liquid, semi-liquid, or gelatinous candy that is accessed by means of an applicator dipped into the second section. The candy 6 is sealed inside the second section 2 by a releasably attached cap 7, which is sealed by a friction force between the cap and the second section. Alternatively, the cap 7 can be attached by other means such as a screw-cap, spring-cap, a PEZ™-style dispenser, hinged cap, or other securing mechanism. If the second section uses an applicator dipped into the candy then the applicator may be permanently, releasably, rotatably, or slidably attached to the second section cap; or, may simply lie loose inside the second section.

The combination product 3 helps appeal to boys because boys will be attracted to the candy. In addition, the combination product can be marked with characters and designs that appeal to boys. For example, the combination product can be marked with popular comic book or movie characters such as Bat Man™ or Harry Potter™. Thus, the combination product helps to open a market for lip balm to boys, a market that has been traditionally dominated by only girls.

Figure 2:
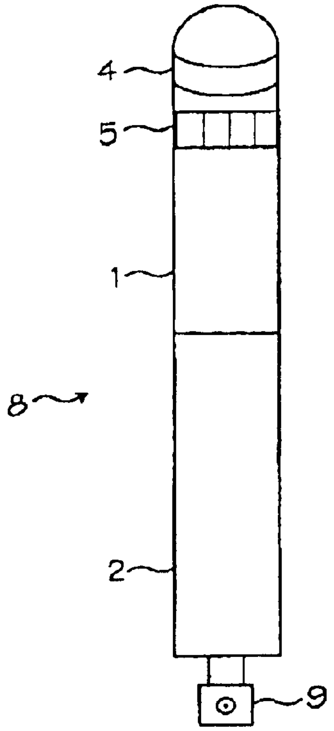
FIG. 2 shows a combined lip balm dispenser and breath spray dispenser.

FIG. 2 shows a combined lip balm dispenser and breath spray dispenser 8. In FIG. 2 the first section 1 comprises a lip balm dispenser made of a non-resilient material, such as a hard plastic, and sealed by a releasably attached cap 4. The actuator 5 is a twist actuator located near the top of the first section 1; however, as described under FIG. 1, the actuator 5 could be located anywhere along the combination product and could use other methods to force lip balm out of the first section 1. In addition, also as described under FIG. 1, the first section can be made from a variety of different materials, decorated in a variety of attractive ways, and have a variety of different shapes. Moreover, the lip balm can comprise a variety of lip balms of different colors, flavors, and consistencies, as described under FIG. 1.

The second section 2 comprises a breath spray dispenser permanently attached to the lip balm dispenser 1 at their respective bottoms. However, the second section may also be releasably, slidably, or rotatably connected to the first section. The second section is made of a non-resilient material, such as a hard plastic. Like the first section, the second section also can be made from a variety of different materials, decorated in a variety of attractive ways, and have a variety of different shapes. The breath spray is pumped out by means of a push pump 9 operatively connected to the second section. Alternatively, the pump 9 can be an aerosol sprayer or a manual pump capable of producing a stream of liquid or a spray. In addition, the pump 9 itself can be molded in a variety of different ornamental forms, such as heads, action figures, plants, animals, things, geometrical patterns, or other shapes of differing colors, transparencies, and styles.

The breath spray comprises a liquid candy, such as sugar water or other commercially available liquid candy, which is sprayed into to the mouth of the consumer. Alternatively, the liquid comprises a sour spray, such as a solution of citric acid, sour apple, or other sour tasting potable liquid. In another alternative, the liquid comprises a breath spray, such as a mint spray, or other breath freshener. Whatever the flavor, the liquid can be colored in order to amuse children who enjoy coloring their tongues.

Figure 3:
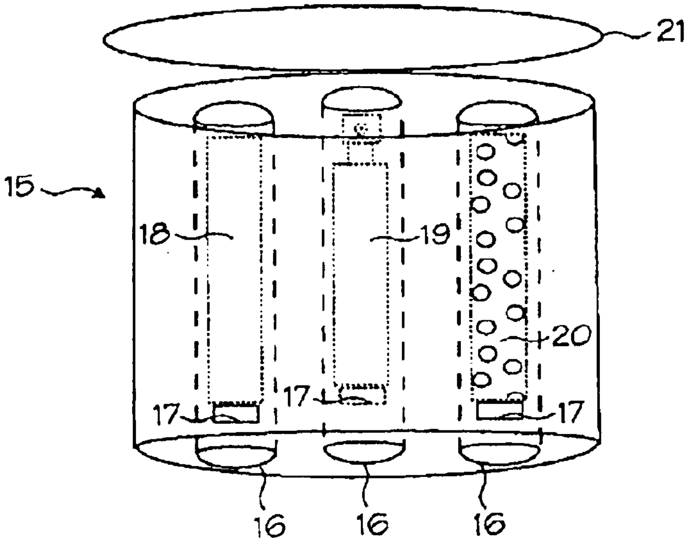
FIG. 3 shows a combined lip balm dispenser, breath spray dispenser, and candy dispenser.

FIG. 3 shows a combined lip balm dispenser, breath spray dispenser, and candy dispenser 15. Each type of product dispenser is disposed within an individual tube 16 or slot that isolates one product from the other two. Each tube 16 is fitted with a actuator 17 that allows a consumer to push the desired dispenser to the point where he or she can gain access to the dispenser. Thus, the consumer can push on the actuator corresponding to the lip balm dispenser 18 to access the lip balm. Likewise, the consumer can push an actuator corresponding to the breath spray dispenser 19 or the candy dispenser 20 in order to gain access to these products. Finally, the combination product is fitted with a releasably attached lid 21 that covers all of the tubes 16.

Other three-in-one combinations are possible than those shown in FIG. 3. For example, two kinds of lip balm and one kind of candy or two kinds of breath spray and one kind of lip balm can be provided. It is readily apparent that many other combinations of lip balm, candy, and breath spray are possible. In addition, each dispenser within a tube can made into a variety of shapes, colors, and decorations, as described for the dispensers in FIGS. 1 and 2. Moreover, the tubes themselves can have a variety of shapes, colors, and decorations. In addition, different kinds of actuators are possible. For example, the product dispensers can be pushed directly from the bottom, be attached to springs, be operably connected to twist actuators, or may use other actuators. Furthermore, each of the actuators may be different from each other.

Figure 4:
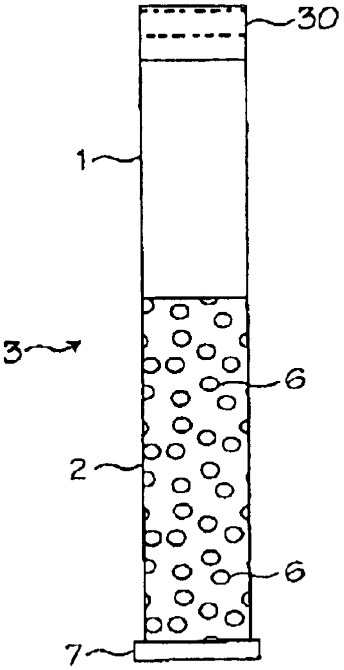
FIG. 4 shows a combined lip balm dispenser and candy dispenser with a sponge applicator disposed on the lip balm dispenser.

FIG. 4 shows a combined lip balm dispenser 1 and candy dispenser 2 with a sponge applicator 30 disposed on the lip balm dispenser. Candy 6 placed inside the candy dispenser is dispensed by actuating the cap 7 and dispensing the candy.

Figure 5:
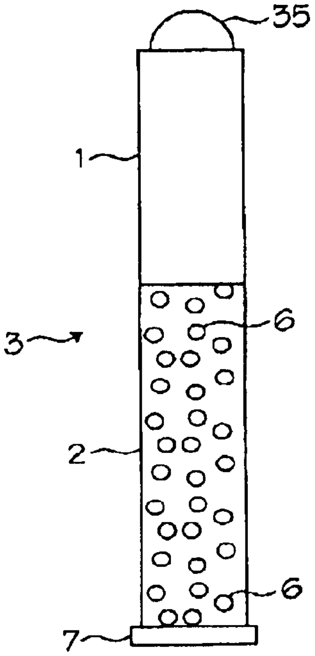
FIG. 5 shows a combined lip balm dispenser and candy dispenser with a roll-on applicator disposed on the lip balm dispenser.

FIG. 5 shows a combined lip balm dispenser 1 and candy dispenser 2 with a roll-on applicator 35 disposed on the lip balm dispenser. Candy 6 placed inside the candy dispenser is dispensed by actuating the cap 7 and dispensing the candy.

Figure 6:
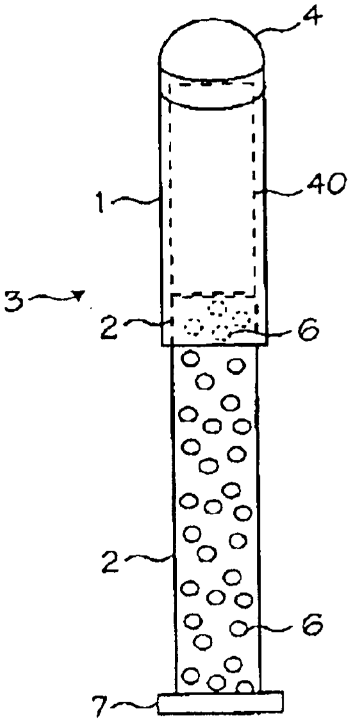
FIG. 6 shows a combined lip balm dispenser and candy dispenser wherein the candy dispenser is slidable within the lip balm dispenser.

FIG. 6 shows a combined lip balm dispenser 1 and candy dispenser 2, wherein the candy dispenser is slidable within the lip balm dispenser. (Lip balm 40, part of the candy dispenser 1 and some of the candy 6 are shown in phantom to indicate their positions within the lip balm dispenser 2.) The candy dispenser 2 has a radius slightly smaller than the radius of the lip balm dispenser 1 and the candy dispenser is slidably attached to the lip balm dispenser. The consumer can dispense lip balm by removing the cap 4 and pushing on the candy dispenser, thereby forcing lip balm 40 out of the top of the lip balm dispenser. The consumer can dispense candy 6 by actuating the cap 7 and dispensing the candy.

In addition, other two-in-one combinations are also possible. For example, a candy dispenser and a breath spray dispenser can be combined into a single product. Likewise, a toothbrush may be combined with a lip balm dispenser. Indeed, any combination of two or three of these individual products can be combined into a single product. Finally, other products can be attached to the inventions to increase their novelty, such as key chains, ornaments, action figures, and other ornamental effects.

The various embodiments of the device for combining candy dispensers and health and beauty dispensers should be packaged and marked to indicate their use as a combination product. For example, where the combination product is a lip balm dispenser and a candy dispenser, the embodiment should be packaged and marked to indicate its use as a combined candy and lip balm dispenser. A possible market name for the combination lip balm dispenser and candy dispenser is 'Lip Candy.' The packages are displayed or placed so that prospective purchasers, such as women—and particularly young women, teenage girls, and young girls—will find them with other candies, other lip balms, or with clothing, jewelry, or other items marketed towards young women. In addition, the product can be marketed to young women and girls by marking the product with designs and colors that are attractive to young women and girls. Similarly, the products can be marketed to men, particularly to young men, teenage boys, and young boys, by appropriately marking and marketing the product to that demographic.

Alternatively, the packages are placed by themselves or near unrelated products in order to generate more interest in the product. In addition, retailers may place associated displays to help increase product sales.

Thus, while the preferred embodiments of the devices and methods have been described in reference to the environment in which they were developed, they are merely illustrative of the principles of the inventions. Other embodiments and configurations may be devised without departing from the spirit of the inventions and the scope of the appended claims.

we claim:

1. A lip treatment system comprising:

a lip balm dispenser, said lip balm dispenser having a bottom and a top, said lip balm dispenser further having a cap releasably attached to the lip balm dispenser top;

a candy dispenser, said candy dispenser having a bottom and a top, said candy dispenser having a radius smaller than the radius of the lip balm dispenser, said candy dispenser further having a cap releasably attached to the candy dispenser top;

wherein the bottom of the candy dispenser is slidably attached to the bottom of the lip balm dispenser to push lip balm out of the top of the lipbalm dispenser.

2. A lip treatment system comprising:

a lip balm dispenser, said lip balm dispenser having a bottom and a top, said lip balm dispenser made from a pliant material such that squeezing of the lip balm dispenser tends to push lip balm out of the top of the lip balm dispenser, said lip balm dispenser further having a cap releasably attached to the lip balm dispenser top;

a candy dispenser, said candy dispenser having a bottom and a top, said candy dispenser further having a cap releasably attached to the candy dispenser top; and candy disposed within the candy dispenser;

wherein the bottom of the lip balm dispenser is connected to the bottom of the candy dispenser.

3. A lip treatment system comprising:

a lip balm dispenser, said lip balm dispenser having a bottom and a top, said lip balm dispenser further comprising a roll-on applicator at the top of said lip balm dispenser, said lip balm dispenser further having a cap releasably attached to the lip balm dispenser top;

a candy dispenser, said candy dispenser having a bottom and a top, said candy dispenser further having a cap releasably attached to the candy dispenser top; and candy disposed within the candy dispenser;

wherein the bottom of the lip balm dispenser is connected to the bottom of the candy dispenser.

* * * * *